United States Patent

Vollmer et al.

[11] Patent Number: 5,667,225
[45] Date of Patent: Sep. 16, 1997

[54] SELF-DRAINING SHAFT SEAL WITH WEDGE-SHAPED TROUGH

[75] Inventors: Angela Vollmer, Dortmund; Joachim Meyer, Hannover, both of Germany

[73] Assignee: Renk Aktiengesellschaft, Augsburg, Germany

[21] Appl. No.: 603,135

[22] Filed: Feb. 20, 1996

[30] Foreign Application Priority Data

Feb. 17, 1995 [DE] Germany .................. 195 05 404.0
Feb. 17, 1995 [DE] Germany .................. 195 05 405.9

[51] Int. Cl.⁶ ............................................. F16J 15/44
[52] U.S. Cl. ........................ 277/68; 277/53; 277/55; 277/136; 277/174
[58] Field of Search ............................ 277/53, 55, 68, 277/136, 174

[56] References Cited

U.S. PATENT DOCUMENTS

| | | | |
|---|---|---|---|
| 2,846,245 | 8/1958 | Weaver | 277/53 |
| 2,850,311 | 9/1958 | Mansfield . | |
| 3,155,395 | 11/1964 | Hoffman . | |
| 3,162,451 | 12/1964 | Brose | 277/53 |
| 3,173,696 | 3/1965 | Reinhardt et al. . | |
| 3,523,692 | 8/1970 | Otto . | |
| 3,971,565 | 7/1976 | Schickling et al. | 277/136 |
| 4,114,902 | 9/1978 | Orlowski | 277/53 |
| 4,429,883 | 2/1984 | Nakanishi | 277/53 |
| 4,721,313 | 1/1988 | Pennink | 277/53 |
| 5,174,583 | 12/1992 | Orlowski et al. . | |
| 5,190,440 | 3/1993 | Maier et al. | 277/70 |
| 5,316,317 | 5/1994 | Fedorovich et al. . | |

FOREIGN PATENT DOCUMENTS

| | | | |
|---|---|---|---|
| 524988 | 5/1931 | Germany | 277/53 |
| 7110633 | 10/1972 | Germany . | |
| 3904718 | 8/1990 | Germany . | |
| 2035472 | 6/1980 | United Kingdom . | |

Primary Examiner—William A. Cuchlinski, Jr.
Assistant Examiner—Christina Annick
Attorney, Agent, or Firm—Natter & Natter

[57] ABSTRACT

A shaft seal includes a plurality of axially spaced annular sealing rings which define oil collection channels. A radial drain aperture extends from the bottom of each channel into an interior trough which extends axially to a discharge orifice in a front end wall of the seal. The bottom of the trough is downwardly inclined for enhanced gravity flow. A portion of the outer periphery of the seal which projects into the housing is outwardly flared and includes a lower discharge lip to provide a return flow surface which directs return flow of sprayed oil away from the seal.

22 Claims, 5 Drawing Sheets

SELF-DRAINING SHAFT SEAL WITH WEDGE-SHAPED TROUGH

BACKGROUND OF THE INVENTION

1. Field of the Invention

This invention relates generally to shaft seals and more particularly to a multiple ring shaft seal with enhanced fluid return.

2. Related History

In instances where rotating shafts projected through housings and wherein fluid, carried on one side of the housing was to be excluded from the other side of the housing, shaft seals were employed between the housing and the shaft to permit rotation of the shaft and preclude passage of the fluid. When rotating shafts were supported by oil lubricated journal bearings, the fluid carried in the housing was a lubricating oil and the housing was configured with an oil return sump for recirculation of the oil.

A typical environment of an oil lubricated journal bearing with shaft seals between a rotating shaft, carried by the bearing, and a housing included operating machinery, for example, blower or compressor shafts.

Among the drawbacks associated with prior oil seals was their inability to effectively seal their rotating shafts and/or preclude leakage between the seal outer periphery and the housing within which the seals were seated.

While seals have been provided with a plurality of axially spaced sealing rings which defined oil collection channels, such seals suffered from inefficient oil return systems, especially with respect to the channels axially spaced from the interior of the housing. The oil return systems generally comprised individual bores with inadequate flow characteristics. The inefficiency of prior oil return systems resulted not only in leakage around the shaft but in oil overheating, especially in environments wherein gravity flow was impeded, e.g. when the axis of the shaft and seal was not fixed in a horizontal plane.

Other problems encountered with prior seals related to the fact that their operation was not axially reversible, that is, seals included an inner axial face and an outer axial face and improper seating in housings was to be avoided.

Further disadvantages of prior shaft seals included the inability to effectively prevent oil, sprayed from the rotating shaft to the interior of the housing, from dripping back on the shaft and entering the seal.

SUMMARY OF THE INVENTION

In compendium, the invention comprises a shaft seal which seats in an aperture of a housing; the seal includes a plurality of collection channels defined by a plurality of axially spaced annular sealing rings. A radial drain aperture extends from the bottom of each channel to an interior trough. The trough extends axially, from the drain aperture of each channel to a discharge orifice at the end wall of the seal which faces the interior of the housing. The bottom of the trough is downwardly inclined from an axial plane toward the discharge orifice for enhanced gravity flow.

A radial key projects from the seal periphery into a keyway formed in the housing aperture to prevent rotation of the seal relative to the housing and the seal periphery is axially unsymmetrical to assure proper seating.

A portion of the outer periphery of the seal which projects into the housing is outwardly flared to a discharge lip to provide an oil return flow surface for sprayed oil which directs flow away from the seal.

From the foregoing, it will be appreciated that an aspect of the present invention is to provide a self-draining shaft seal of the general character described which is not subject to the disadvantages of the related history aforementioned.

A feature of the present invention is to provide a self-draining shaft seal of the general character described which includes a plurality of collection channels and assures effective sealing through enhanced return flow from the channels to a collection sump.

A consideration of the present invention is to provide a self-draining shaft seal of the general character described with simplified assembly and installation.

To provide a self-draining shaft seal of the general character described with improved return flow characteristics for fluid which has been sprayed from a rotating shaft into the interior of a housing is a further aspect of the present invention.

A further feature of the present invention is to provide a self-draining shaft seal of the general character described which is low in cost and suitable for economic mass production fabrication.

Another feature of the present invention is to provide a self-draining shaft seal of the general character described which is precluded from rotating relative to a housing within which it is seated.

Another consideration of the present invention is to provide a self-draining shaft seal of the general character described which is configured to preclude incorrect installation in a housing and assures proper orientation for self draining.

To provide a self-draining shaft seal of the general character described with increased sealing efficiency is another feature of the present invention.

A still further consideration of the present invention is to provide a self-draining shaft seal of the general character described with a peripheral collar having bevelled edges for simplified snap fit seating in a mating groove of a housing aperture.

A further aspect of the present invention is to provide a self-draining shaft seal of the general character described which provides an efficient barrier for a variety of fluids.

Yet another consideration of the present invention is to provide a self-draining shaft seal of the general character described which is configured to assure the return of lubricating oil to a collection sump without affording an opportunity for the oil to overheat.

An additional aspect of the present invention is to provide a self-draining shaft seal of the general character described which provides a superior barrier against fluid passage between a housing and the periphery of the seal, seated in the housing.

Other aspects, features and considerations of the present invention in part will be obvious and in part will be pointed out hereinafter.

With these ends in view, the invention finds embodiment in certain combinations of elements, arrangements of parts and series of steps by which the said aspects, features and considerations aforementioned and certain other aspects, features and considerations are attained, all with reference to the accompanying drawings and the scope of which is more particularly pointed out and indicated in the appended claims.

BRIEF DESCRIPTION OF THE DRAWINGS

In the accompanying drawings, in which is shown one of the various possible exemplary embodiments of the invention.

DESCRIPTION OF THE PREFERRED EMBODIMENT

Figure 8B:
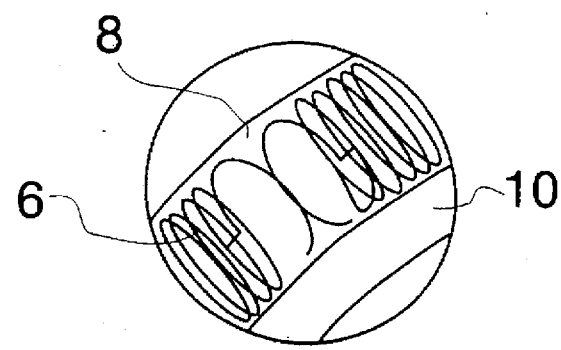
FIG. 8 is an enlarged scale perspective view of the self-draining shaft seal with a partial view, enlarged for magnification, showing the manner in which the ends of a coil spring, seated in an annular flange, are joined.
Figure 8A:
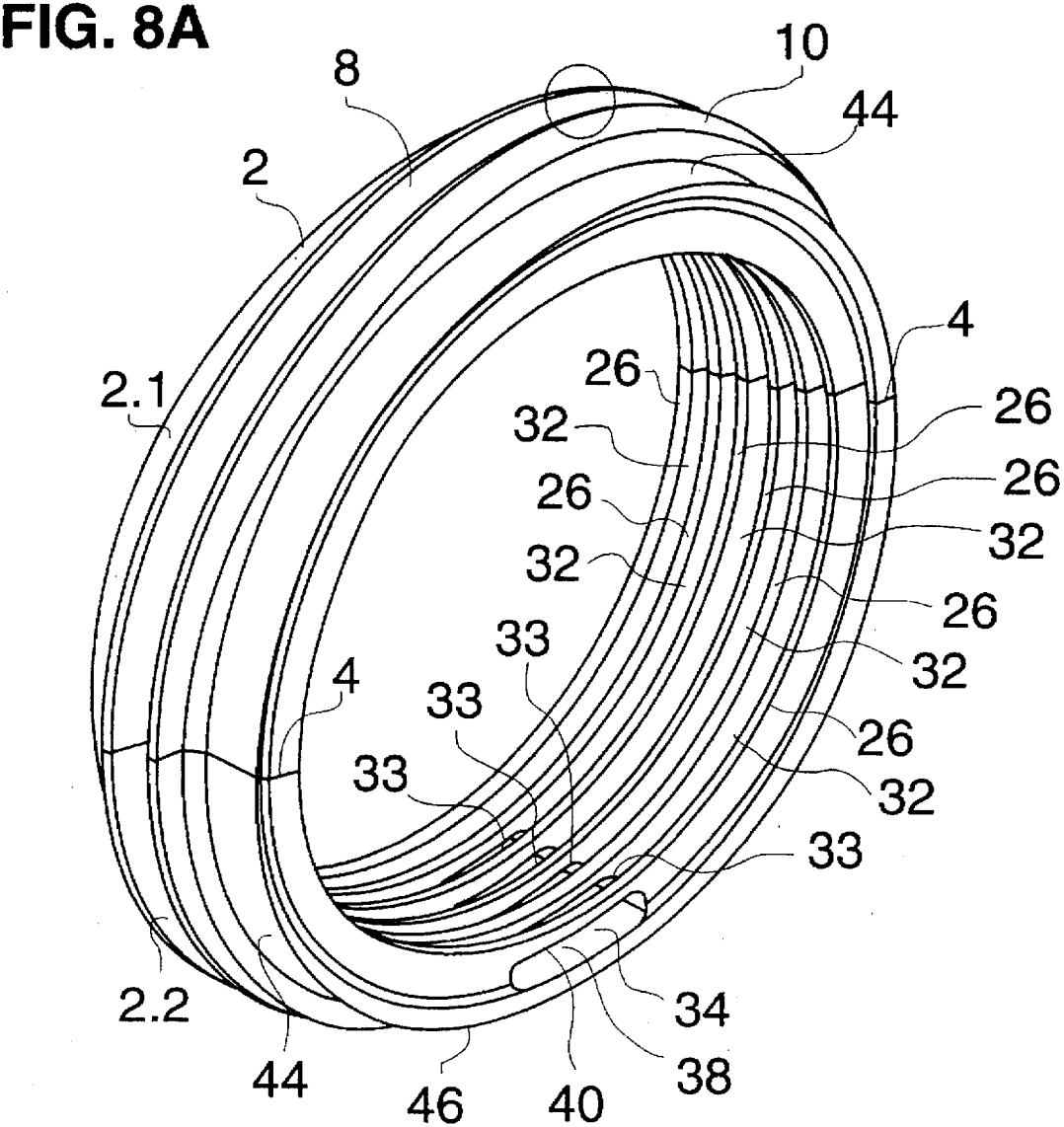

Referring now in detail to the drawings, the reference numeral 2 denotes generally a self-draining shaft seal constructed in accordance with and embodying the invention. The seal is formed along an axis 30 with a body of generally cylindrical configuration. An upper semi-circular section 2.1 and a lower semi-circular section 2.2 are joined along a horizontal axial plane 4 to assemble the seal 2. In accordance with the invention, the upper semi-circular section 2.1 and the lower semi-circular section 2.2 are not interchangeable, nor is the seal 2 axially symmetrical. The sections of the seal 2 are held together by a helical coil tension spring 6 which is seated in a channel 8 formed in an annular flange 10 which projects significantly from an outer periphery 22 of the seal. The ends of the spring 6 are looped together as shown in FIG. 8.

Figure 4:
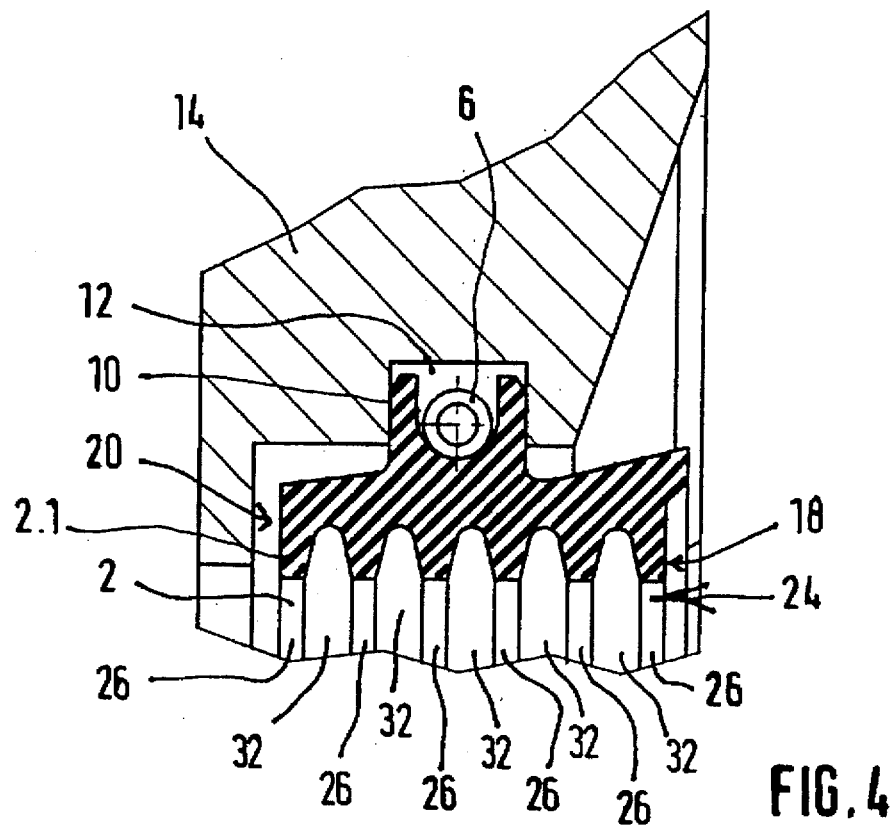
FIG. 4 is an enlarged fragmentary sectional view of the self-draining shaft seal and a housing, similar to the view of FIG. 3, however, showing only the upper portion of the seal operatively positioned in a left shaft aperture of the housing.
Figure 5:
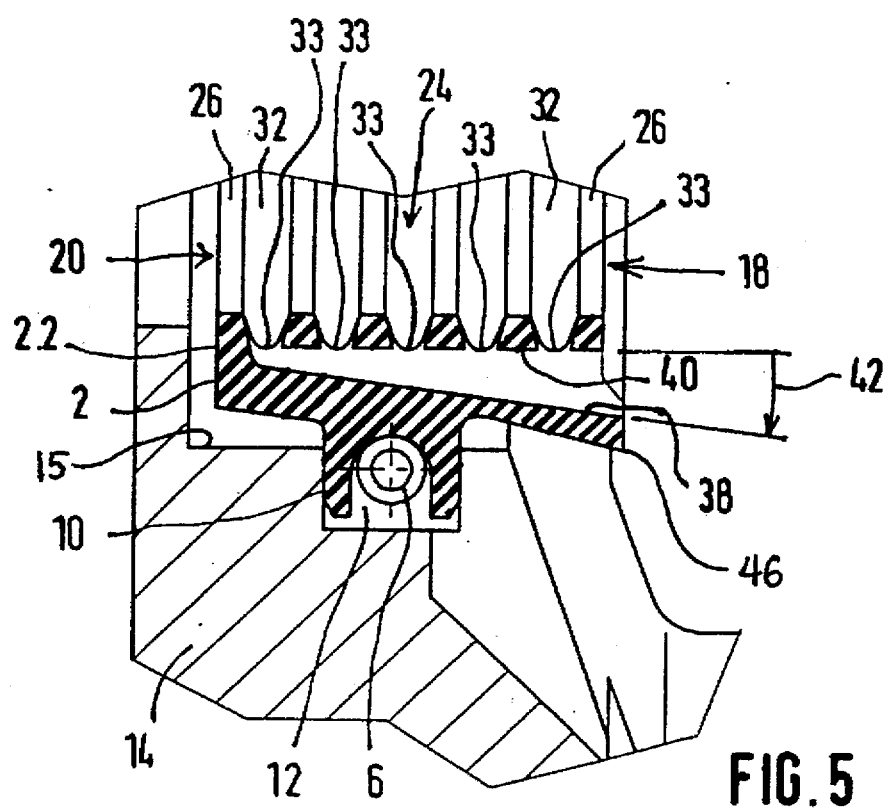
FIG. 5 is an enlarged fragmentary sectional view of the shaft seal and a corresponding portion of the housing, similar to that shown in FIG. 4, however, showing the lower portion of the seal and the housing with a plurality of axially spaced collection channels and a fluid return trough having a discharge orifice through the end wall of the seal.
Figure 6:
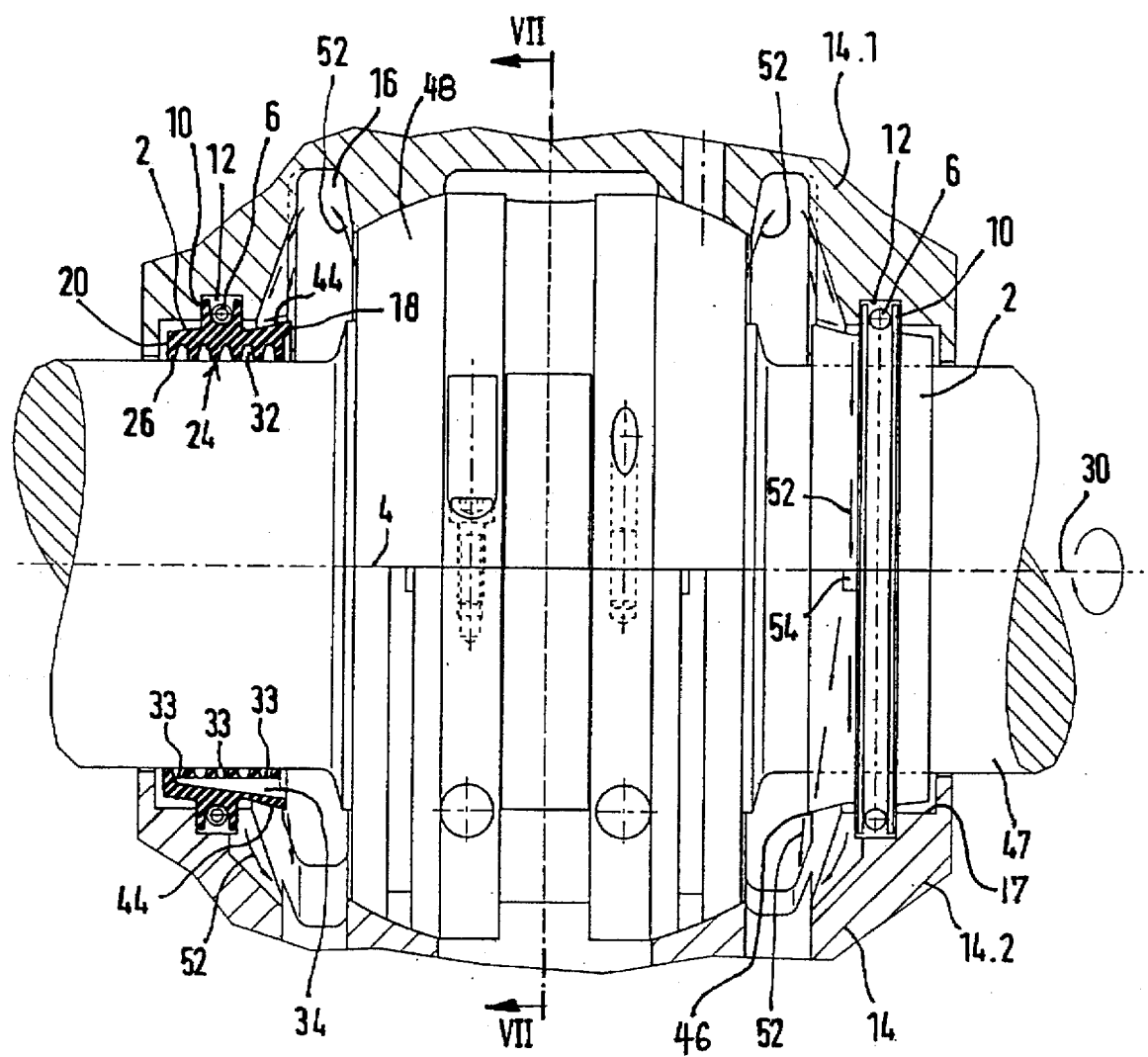
FIG. 6 is a reduced scale axial sectional view through the housing carrying a shaft, a bearing and a self-draining shaft seal seated in each of two shaft apertures and with the seal seated in the left shaft aperture being shown in section.

In the typical environment illustrated in FIG. 6, a pair of seals 2 are seated in a pair of apertures 15, 17 of a housing 14. A rotating shaft 47 projects through the apertures 15, 17. Each aperture includes a radial groove 12 which receives the flange 10. It will be noted from an examination of FIGS. 4 and 5 that the edges of the flange 10 are beveled to facilitate seating the seal 2 in the shaft apertures 15, 17 and snap fit engagement of the flange 10 in the groove 12. It will also be noted, from an observation of FIGS. 4 and 5 that radial clearance is provided between the peripheral edge of the flange 10 and the groove 12. Such clearance is in the order of approximately 1 mm in all radial directions and accommodates production tolerances, shaft deflections, etc. which would otherwise damage the seal 2.

In order to more effectively prevent leakage of fluid between the seal periphery and the apertures 15, 17, the flange 10 projects radially a distance greater than one-half the axial thickness of the flange and approximately one-quarter the axial length of the seal and proportionately greater than flanges of prior seals.

The seal 2 is preferably fabricated of a material which is capable of withstanding a wide range of temperatures, chemicals, and even radiation, depending upon the particular operative environment in which it is placed. The material must exhibit requisite strength yet be sufficiently flexible to provide adequate sealing. Examples of suitable materials include high temperature stable polyamides with desirable self-lubricating characteristics and also admixtures such as PTFE with glass fibers.

Figure 1:
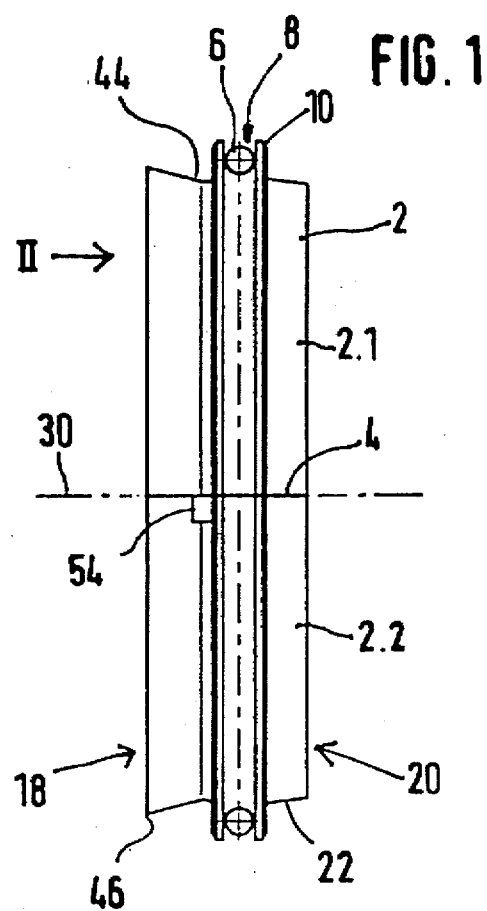
FIG. 1 is a side elevational view of a self-draining shaft seal constructed in accordance with and embodying the invention and showing the seal formed of two semi-circular sections joined along a horizontal plane.
Figure 3:
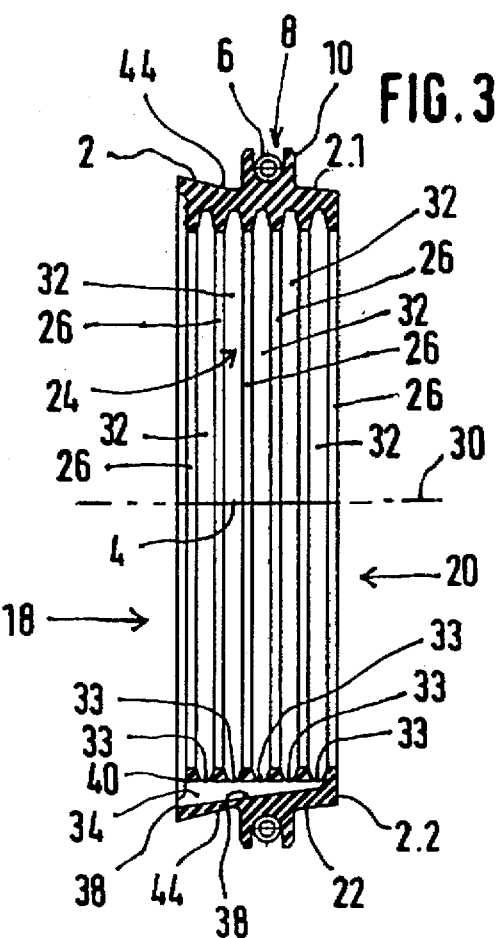
FIG. 3 is an axial sectional view of the self-draining shaft seal, the same being taken substantially along the plane III—III of FIG. 2.
Figure 2:
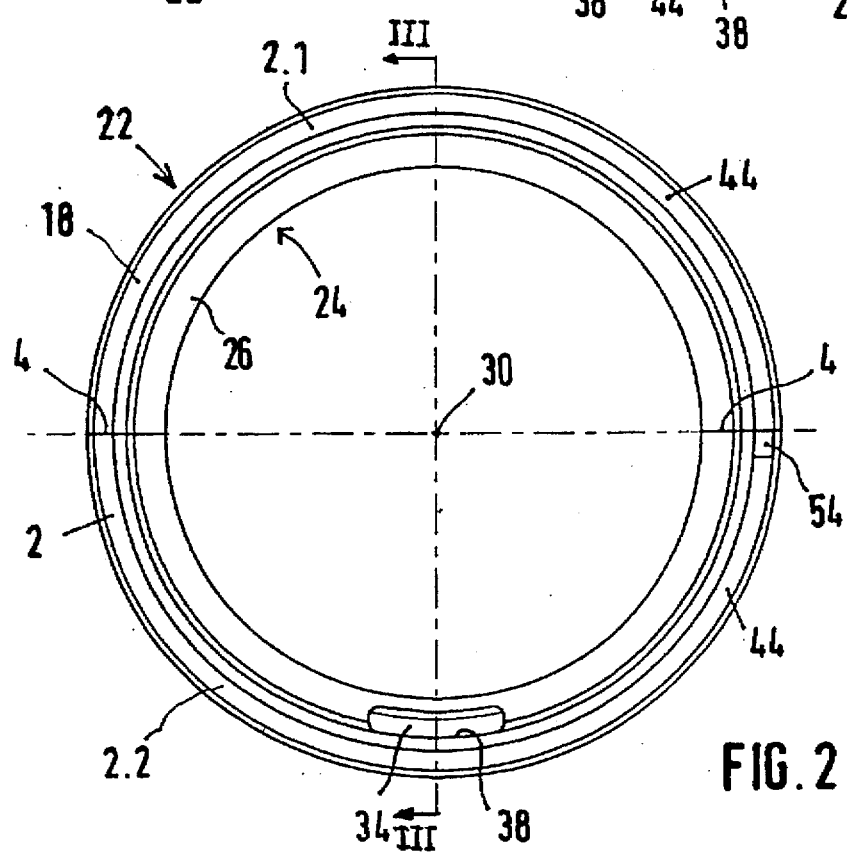
FIG. 2 is an end view of the self-draining shaft seal, the same being taken substantially along the arrow II of FIG. 1 and illustrating a fluid discharge orifice in an end wall of the seal which faces the interior of a housing.
Figure 7:
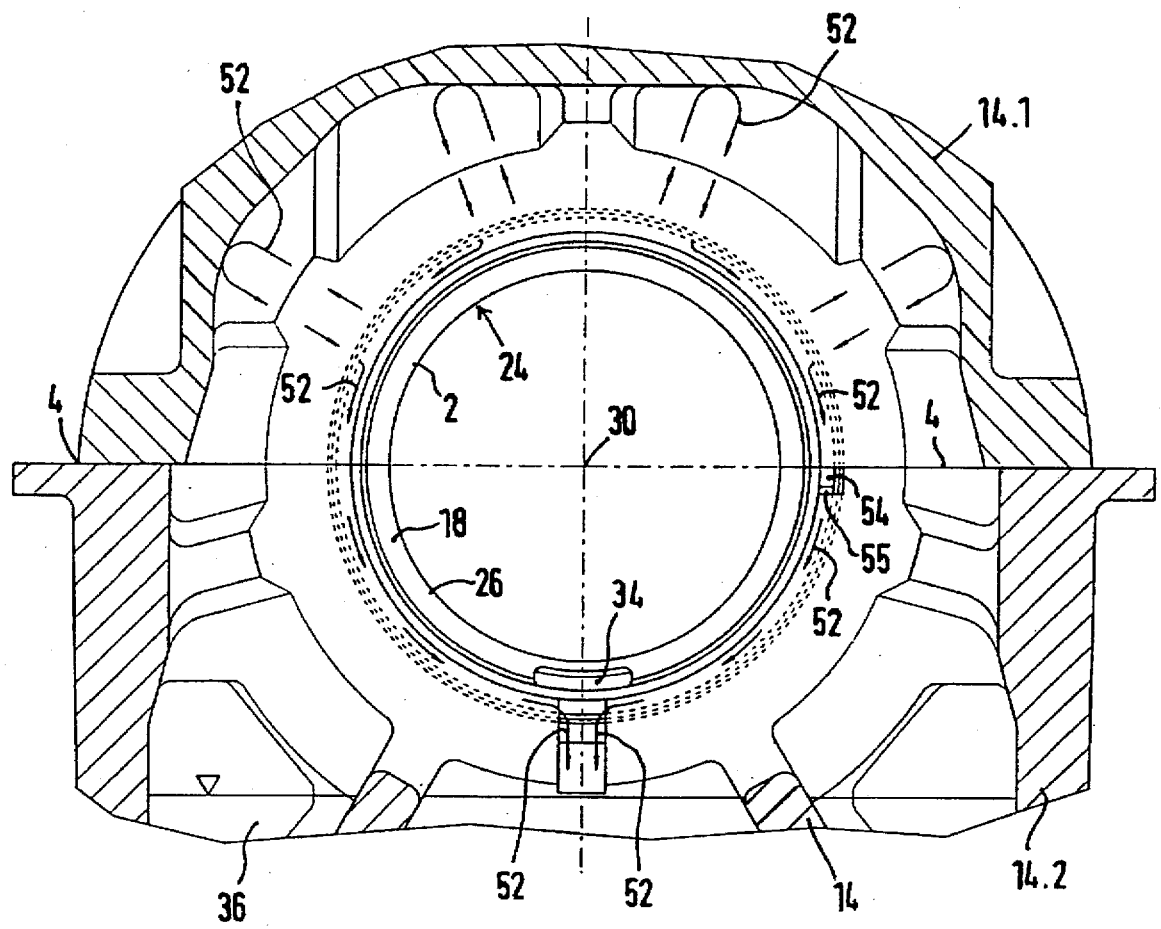
FIG. 7 is a sectional view through the housing without the shaft taken substantially along the line VII—VII of FIG. 6 and showing the self-draining shaft seal seated in the right shaft aperture.

As previously mentioned, the seal 10 is configured to be seated in a shaft aperture 15, 17 which extends through the housing 14 as illustrated in FIGS. 4 through 7. The housing 14 may be formed of a pair of housing sections, an upper section 14.1 and a lower section 14.2, joined along the horizontal axial plane 4 as illustrated in FIG. 7. The housing 14 includes an interior 16 which may carry a bearing 48, illustrated in FIG. 2 as being pivotally mounted within the housing 14 with mating spherical supporting surfaces on the bearing 48 and the housing interior 16.

The seal 2 includes an inner periphery 24, configured with a plurality of sealing rings 26 which are axially spaced from one another, commencing at a front end wall 18, (facing the housing interior 16) to a rear end wall 20. The sealing rings 26 are configured to engage the outer periphery of the shaft 47 which extends through the apertures 15, 17. Lubricating oil, carried on the shaft 47, will propagate axially along the shaft 47 from the sealing ring 26, at the front end wall 18, into annular collection channels 32 which are formed between the successive sealing rings 26. Each successive sealing ring 26 provides an additional barrier to oil seepage and provides an annular wall surface for at least one collection channel 32.

In accordance with the invention, there are at least six sealing rings 26 in the seal 2 which, in itself, provides an improvement in sealing efficiency over previous seals which employed a fewer number of sealing rings, hence collection channels.

Significantly improved return flow of oil from the collection channels is achieved so that oil is returned as quickly as possible to a sump 36 in the housing interior 16 without affording an opportunity for the oil to fill the collection channels and penetrate beyond its sealing ring to the next collection channel or beyond the last seating ring at the rear end wall 20 or to allow the collected oil to become significantly heated, as would occur if the oil remained in the collection channels for extended periods.

Pursuant to the invention, at the bottom of each collection channel, an elongate drain aperture 33 is provided. As will be observed in FIG. 8, each drain aperture 33 comprises a slot which extends along an arc in a circumferencial direction with an angle of sector in the order of 10° to 15°, e.g. 13°.

Each drain aperture 33 leads into an interior trough 34 which extends axially, from the radial drain aperture 33 adjacent the rear end wall 20, axially inwardly to a discharge orifice in the front end wall 18. The trough includes a bottom wall 38 which is radially inwardly spaced from the shell periphery 22 and is downwardly inclined from the aperture 33 adjacent the rear end wall 20, toward the front end wall discharge orifice for enhanced return oil flow. The trough 34 includes a top wall 40 through which the drain apertures 33 extend. The top wall 40 and bottom wall 38 are both curved in transverse cross section along arcs concentric with the axis 30. The radius of curvature of the bottom wall 38 increases progressively along transverse axial sections approaching the discharge orifice.

In transverse cross section, the width of the trough 34 (along an arc in a circumferencial direction) is defined by an angle of sector in the order of 10° to 15°, e.g. 13° and exceeds the heighth of the trough (in a radial direction) by a multiple of at least two, with a ratio of approximately five to one being illustrated. Such heighth to width ratio is necessary, at least at the discharge orifice formed in the front end wall 18, and preferably throughout the entire axial length of the trough 34.

With the relatively large flow path provided by the trough 34, oil which has penetrated the seal 2 beyond the front end wall sealing ring 26 and which is collected in the interior collection channels 32, will readily flow without constraint through the trough discharge orifice in the front end wall 18 and into the sump 36 of the housing interior 16.

It should be noted that the axial slope angle 42 of the trough bottom wall 38 preferably in the order of, for example, 7.5° and provides enhanced gravity return flow for the collected oil and assures a continuous flow path which is unimpeded in the event the axis 30 is inclined from the horizontal, as might occur if the shaft 47 and housing 14 were in an environment subject to tilting, such as may be encountered on a ship.

The inherent advantages of providing a sloped bottom wall 38 for the trough 34 is not only beneficial in instances wherein the axis 30 is not horizontal, but also assures unimpeded drainage from the individual collection channels 32. This is because the cross section of the trough 34 increases progressively as the number of channels discharging oil into the trough increases. For example, at the drain aperture 33 closest to the rear end wall 20 (as depicted in FIG. 5), the cross section of the trough 34 is at its smallest area, which coincides with the fact that the trough is, at that point, receiving only oil flow from only one collection channel. The transverse cross section of the trough increases progressively at the next successive drain aperture 32 (advancing to the right as viewed in FIG. 5), where the trough must accommodate flow from two collection channels. The cross section increases to its maximum cross section at the discharge orifice in the front end wall 18 where the discharge oil flow from five collection channels is accommodated. In longitudinal (axial) cross section the trough 34 is shaped as a hollow wedge.

One will appreciate that an incline in the bottom wall 38 of the trough 34 is not mandatory because of the significantly greater transverse cross section flow area provided by the trough 34, in lieu of the return bores heretofore employed.

Between the annular flange 10 and the front end wall 18, the outer periphery 22 of the seal 2 is configured with a conical outward flare, extending toward the front end wall 18. While the maximum diameter of the periphery 22 at the front end wall 18 is greater than the diameter of the shaft aperture in the housing 14, so as to preclude inadvertent improper seal seating within the shaft aperture 15, 17, the outwardly flared peripheral surface is primarily so configured to provide an oil flow return surface 44 projecting into the housing interior 16 and which extends completely around the circumference of the seal 2.

The return flow surface 44 receives deposits of oil sprayed from the shaft 47 by centrifugal force against the interior 16 of the housing 14 as indicated in the radially outwardly directed arrows 52 in FIGS. 6 and 7. Oil discharged from the bearing 48 is also deposited against the housing interior walls as depicted by the arrows 52.

The sprayed oil thereafter drips and/or flows downwardly, also indicated by the arrows 52 in FIGS. 6 and 7, along surfaces defining the housing interior 16 and deposits on the return flow surface 44. Oil deposited on the flow return surface 44 above the horizontal plane 4, drips downwardly along the flow return surface to the portion of the flow return surface 44 below the horizontal plane and continues to flow downwardly, finally dripping from a discharge lip 46 at the axial end and into the sump 36. The return flow surface 44 on the periphery 22 of the seal thus assures that a sprayed oil return flow path directs oil away from the rotating shaft 47 and away from the first sealing ring 26 at the front end wall 18.

As mentioned, the outer periphery 22 of the seal is not symmetrical in an axial direction. Not only is the annular flange 10 positioned off-center but, the diameter of the periphery 22 at the rear end wall 20 is significantly less than the periphery diameter at the front end wall 18. This assures that the seal 2 can only be inserted into its appropriate shaft aperture in proper orientation. For example, as shown in FIG. 6, two seals are carried in the housing 14, in directions facing one another. Interference between the maximum diameter of each seal 2 at the front end wall 18 and the diameter of the shaft aperture at the housing interior 16 precludes improper seating of the seals.

Further, it is significant to assure that the seal 2 will be seated in the shaft aperture with the lower section 2.2 at the bottom, rather than at the top of the housing and with the trough 34 centered in a vertical axis for optimum performance. For such purpose, the lower section 2.2 includes a radially projecting key or lug 54 which includes an upper surface extending along the horizontal plane 4 and which is received in a mating keyway or notch 55 formed in the lower housing section 14.2. The key 54 and keyway 55 engagement also assures that the seal 2 will not rotate relative to the housing 14.

While the seal 2 has been described, in an illustrative manner as being effective for maintaining lubricating oil within a bearing housing, the invention should not be construed as limited to such environment and may be efficaciously employed in different and further rotating shaft environments, for example for sealing other liquids such as water, chemical solutions, etc. and in environments wherein a bearing is not carried in the housing.

Thus it will be seen that there is provided a self draining shaft seal which achieves the various aspects, features and considerations of the present invention and which is well adapted to meet the conditions of practical usage.

Since various possible embodiments might be made of the present invention and since various changes might be made in the exemplary embodiment shown herein without departing from the spirit of the invention, it is to be understood that all matter herein described shown in the accompanying drawings is to be interpreted as illustrative and not in a limiting sense.

Having thus described the invention, there is claimed as new and desired to be secured by Letters Patent:

1. A self-draining seal for a rotating shaft, the seal comprising a generally cylindrical body having an axis, a radially outer periphery, a radially inner periphery, an axially inner front end wall and an axially outer rear end wall, means for seating the seal in an aperture of a housing, a plurality of axially spaced sealing rings on the radially inner periphery, each of the sealing rings being continuous and unbroken, the sealing rings contacting the rotating shaft and defining annular collection channels therebetween, one collection channel being adjacent the axially inner front end wall and another collection channel being adjacent the axially outer rear end wall, means forming a trough in the body, the trough extending axially within the body below the plurality of sealing rings, below the collection channels and radially spaced between each collection channel and the radially outer periphery of the seal, the trough including means forming a discharge orifice in the axially inner front end wall, means forming a drain aperture at a bottom of each channel, the trough including a radially outer bottom wall and a radially inner top wall, each drain aperture extending through the radially inner top wall, the radially outer bottom wall diverging radially outwardly and axially inwardly toward the discharge orifice such that the transverse cross section of the trough increases radially outwardly and axially inwardly continuously toward the discharge orifice, the trough being of generally wedge shaped longitudinal cross section.

2. A self-draining shaft seal as constructed in accordance with claim 1 wherein the means for seating the seal in an aperture of a housing comprises an annular flange, the annular flange being formed on the outer periphery and being concentric with the axis.

3. A self-draining shaft seal as constructed in accordance with claim 2 wherein the annular flange includes exposed edges, the exposed edges being beveled to facilitate easy snap fit seating of the seal in the housing aperture.

4. A self-draining shaft seal as constructed in accordance with claim 1 wherein the bottom of the trough is curved in transverse cross section along an arc having a center concentric with the axis, the arc having a radius of curvature progressively increasing from the drain aperture of the other collection channel toward the discharge orifice.

5. A self-draining shaft seal as constructed in accordance with claim 1 wherein the seal is configured with an axial length greater than the housing thickness at the housing aperture such that a portion of the outer periphery projects into the housing when the seal is seated, and means forming an annular return flow surface on the projecting periphery portion for collection and draining of liquid sprayed within the housing from the shaft by centrifugal force.

6. A self-draining shaft seal as constructed in accordance with claim 5 wherein the return flow surface extends between the means for seating the seal and the front end wall.

7. A self-draining shaft seal as constructed in accordance with claim 5 wherein the means forming the annular return flow surface comprises a conical flare on the projecting periphery portion.

8. A self-draining shaft seal as constructed in accordance with claim 7 further including means forming a discharge lip in communication with the return flow surface, the discharge lip being positioned at a lower extremity of the seal adjacent the front end wall.

9. A self-draining shaft seal as constructed in accordance with claim 1 wherein the outer periphery is axially unsymmetrical, whereby, the seal may not be improperly seated in the housing aperture.

10. A self-draining shaft seal as constructed in accordance with claim 9 wherein the outer periphery diameter of the seal at the front end wall is greater than the diameter of the housing aperture at the interior of the housing and the outer periphery diameter of the seal at the rear end wall is not greater than the diameter of the housing aperture at the interior of the housing, whereby, the seal may be seated in the housing aperture only with the rear end wall facing outwardly and the front end wall facing inwardly.

11. A self-draining shaft seal as constructed in accordance with claim 1 wherein the seal is formed of two sections, joined along a horizontal plane.

12. A self-draining shaft seal as constructed in accordance with claim 11 further including means for maintaining the seal sections together prior to seating the seal in the housing aperture, the means for maintaining the sections together comprising an annular flange formed on the outer periphery, the annular flange including a channel and endless tensioning means carried in the channel.

13. A self-draining shaft seal as constructed in accordance with claim 12 wherein the endless tensioning means comprises a coil spring.

14. A self-draining shaft seal as constructed in accordance with claim 1 further including means for precluding insertion of the seal in the housing aperture with the trough other than in a vertical axis and at the bottom of the seal, the means for precluding comprising means forming a radial key integral with the seal, the key being adapted to be seated in a mating keyway of the housing, the key further serving to fix the seal against rotation relative to the housing.

15. A self-draining seal for a rotating shaft, the seal comprising a generally cylindrical body having an axis, a radially outer periphery, a radially inner periphery, an axially inner front end wall and an axially outer rear end wall, means for seating the seal in an aperture of a housing, a plurality of axially spaced sealing rings on the inner periphery, each sealing ring being continuous and unbroken, the sealing rings contacting the rotating shaft and defining annular collection channels therebetween, one collection channel being adjacent the front axially inner end wall and another channel being adjacent the rear axially outer end wall, means forming a trough in the body, the trough extending axially within the body below the plurality of sealing rings, below the collection channels and radially spaced between each collection channel and the radially outer periphery of the seal, the trough including means forming a discharge orifice in the axially inner front end wall, means forming drain apertures at a bottom of each channel, the trough including a radially outer bottom wall and a radially inner top wall, each drain aperture extending through the radially inner top wall, the transverse cross section of the trough having a width to heighth ratio of at least two to one, whereby a flow path of adequate capacity for the draining of all collection channels is provided.

16. A self-draining shaft seal as constructed in accordance with claim 15 wherein the width to heighth ratio is in the order of five to one.

17. A self-draining shaft seal as constructed in accordance with claim 15 wherein the bottom wall of the trough diverges radially away from the axis from the drain aperture of the other collection channel toward the discharge orifice in the front end wall such that the transverse cross section of the trough increases continuously toward the discharge orifice, the trough being of generally wedge shaped longitudinal cross section.

18. A self-draining seal for a rotating shaft as constructed in accordance with claim 1, the means for seating the seal comprising an annular flange protecting radially from the outer periphery, the seal further including means forming an annular return flow surface on the outer periphery between the annular flange and the front end wall for collection and draining of liquid sprayed within the housing from the shaft by centrifugal force, the return flow surface having a maximum peripheral diameter at the front end wall and a minimum peripheral diameter adjacent the annular flange.

19. A self-draining shaft seal as constructed in accordance with claim 18 wherein the means forming the annular return flow surface comprises a conical flare on the outer periphery between the flange and the front end wall.

20. A self-draining shaft seal as constructed in accordance with claim 18 further including means forming a discharge lip in communication with the return flow surface, the discharge lip being positioned at a lower extremity of the seal adjacent the front end wall.

21. A self-draining shaft seal as constructed in accordance with claim 1 further including a shaft and a bearing, the shaft being carried by the bearing, the shaft extending through the seal, the shaft having an outer periphery in engagement with the sealing rings.

22. A self-draining shaft seal as constructed in accordance with claim 21 further including a housing, the bearing being carried within the housing, the housing having a pair of housing apertures, the shaft extending through both housing apertures, the seal being seated in one of the housing apertures and a further seal being seated in the other housing aperture, the seals being coaxial and the front end walls of each seal facing one another.

* * * * *